US006809143B2

(12) United States Patent
Nowak et al.

(10) Patent No.: US 6,809,143 B2
(45) Date of Patent: Oct. 26, 2004

(54) GEL COMPOSITIONS BASED ON REACTION PRODUCTS OF POLYOLS AND POLYISOCYANATES

(75) Inventors: Rüdiger Nowak, Kahl/Main (DE); Helmut Steinbach, Herten (DE); Adolf Stender, Duderstadt (DE)

(73) Assignee: Technogel GmbH & Co., Duderstadt (DE)

( * ) Notice: Subject to any disclaimer, the term of this patent is extended or adjusted under 35 U.S.C. 154(b) by 442 days.

(21) Appl. No.: 09/775,498

(22) Filed: Feb. 5, 2001

(65) Prior Publication Data
US 2001/0047047 A1 Nov. 29, 2001

(30) Foreign Application Priority Data
Feb. 8, 2000 (DE) .......................................... 100 05 495

(51) Int. Cl.$^7$ ................................................. C08K 3/34
(52) U.S. Cl. ......................... 524/493; 524/492; 524/497
(58) Field of Search ................................ 524/492, 493, 524/497

(56) References Cited

U.S. PATENT DOCUMENTS 4,377,417 A * 3/1983 Brand ......................... 106/300
5,362,834 A * 11/1994 Schapel et al. ............... 528/58

* cited by examiner

Primary Examiner—Edward J. Cain
(74) Attorney, Agent, or Firm—Smith, Gambrell & Russell, LLP

(57) ABSTRACT

Gel compositions based on reaction products of polyols and polyisocyanates contain as filler at least one pyrogenically produced oxide of a metal or metalloid.

The gel compositions are used in structural parts or articles.

23 Claims, No Drawings

GEL COMPOSITIONS BASED ON REACTION PRODUCTS OF POLYOLS AND POLYISOCYANATES

INTRODUCTION AND BACKGROUND

The present invention relates to gel compositions based on reaction products of polyols and polyisocyanates.

Gel compositions based on reaction products of polyols and polyisocyanates (polyurethanes) are used in pressure distributing elements, for example in cushions for wheelchairs (EP 0 511 570 B1). The known gel compositions may contain inorganic fillers, such as for example barytes, chalk, gypsum, kieserite, sodium carbonate, titanium dioxide, quartz sand, kaolin, carbon black or glass beads.

The known gel compositions have the disadvantage that their mechanical properties, such as for example their mechanical strength and elongation at break, are not adequate.

SUMMARY OF INVENTION

The present invention provides gel compositions based on reaction products of polyols and polyisocyanates, wherein they contain at least one pyrogenically produced oxide of a metal or metalloid as filler.

The pyrogenically produced oxides may preferably be prepared by flame hydrolysis.

Pyrogenically produced oxides of metals and/or metalloids are known from Ullmanns Enzyklopadie der technischen Chemie 4$^{th}$ Edition, Vol. 21, pp. 464 (1982).

DETAILED DESCRIPTION OF INVENTION

In one embodiment of the invention the gel compositions may contain physical mixtures of pyrogenically produced oxides of metals and/or metalloids.

The gel compositions according to the invention may also contain pyrogenically produced mixed oxides of metals and/or metalloids.

The following pyrogenically produced oxides may for example be used according to the invention:

silicone dioxide, aluminum oxide, mixed oxide of silicon dioxide and aluminum oxide, titanium dioxide, mixed oxide of titanium dioxide and iron oxide.

According to the invention there may also be used pyrogenically produced oxides that have undergone a surface treatment, such as for example:

Aerosil R 8200, Aerosil R972, Aerosil R974, Aerosil R805

Aerosil R 202, Aerosil R812. These oxides are described in Pigments Leaflet No. 27 (August 1993) published by Degussa AG.

The following may be used as surface-treatment agents:

dimethyl dichlorosilane, trimethyl dichlorosilane, hexamethyl disilazane, polydimethyl siloxanes, and alkyl silanes such as for example trimethoxyoctyl silane.

In particular the following pyrogenically produced oxides may be used:

| Test method | | AEROSIL 90 | AEROSIL 130 | AEROSIL 150 | AEROSIL 200 | AEROSIL 300 | AEROSIL 380 | AEROSIL OX 50 | AEROSIL TT 600 | AEROSIL MOX 80 | AEROSIL MOX 170 | AEROSIL COK 84 |
|---|---|---|---|---|---|---|---|---|---|---|---|---|
| Behavior to water | | | | hydrophilic | | | | | | hydrophilic | | |
| Appearance | | | | loose white powder | | | | | | loose white powder | | |
| Surface according to BET[1] | m2/g | 90 + 15 | 130 + 25 | 150 + 15 | 200 + 25 | 300 + 30 | 380 + 30 | 50 + 15 | 200 + 50 | 80 + 20 | 170 + 30 | 170 + 30 |
| Mean size of the primary particles | nm | 20 | 16 | 14 | 12 | 7 | 7 | 40 | 40 | 30 | 15 | — |
| Tamped density (approx. value)[2] | g/l | 80 | 50 | 50 | 50 | 50 | 50 | 130 | 60 | 60 | 50 | 50 |
| Compacted product (additive "V") | g/l | 120 | 120 | 120 | 120 | 120 | 130 | | | | | |
| VV product (additive "VV") | g/l | | | 50/75 | 50/75 | 50/75 | | | | | | |
| | g/l | | | | 120/150 | 120/150 | | | | | | |
| Drying loss[3] (2 hours at 105° C.) on leaving the supplier | % | <1.0 | <1.5 | <0.59) | <1.5 | <1.5 | <2.0 | <1.5 | <2.5 | <1.5 | <1.5 | <1.5 |
| Annealing loss[4,7] (2 hours at 1000° C.) | % | <1 | <1 | <1 | <1 | <2 | <2.5 | <1 | <2.5 | <1 | <1 | <1 |
| pH value[5] | | 3.7–4.7 | 3.7–4.7 | 3.7–4.7 | 3.7–4.7 | 3.7–4.7 | 3.7–4.7 | 3.8–4.8 | 3.6–4.5 | 3.6–4.5 | 3.6–4.5 | 3.6–4.3 |
| $SiO_2$[8] | % | >99.8 | >99.8 | >99.8 | >99.8 | >99.8 | >99.8 | >99.8 | >99.8 | >98.3 | >98.3 | 82–86 |
| $Al_2O_3$[8] | % | <0.05 | <0.05 | <0.05 | <0.05 | <0.05 | <0.05 | <0.08 | <0.05 | 0.3–1.3 | 0.3–1.3 | 14–18 |
| $Fe_2O_3$ | % | <0.003 | <0.003 | <0.003 | <0.003 | <0.003 | <0.003 | <0.01 | <0.003 | <0.01 | <0.01 | <0.1 |
| $TiO_2$[8] | % | <0.03 | <0.03 | <0.03 | <0.03 | <0.03 | <0.03 | <0.03 | <0.03 | <0.03 | <0.03 | <0.03 |

-continued

| Test method | | AERO-SIL 90 | AEROSIL 130 | AEROSIL 150 | AEROSIL 200 | AEROSIL 300 | AEROSIL 380 | AERO-SIL OX 50 | AEROSIL TT 600 | AERO-SIL MOX 80 | AEROSIL MOX 170 | AERO-SIL COK 84 |
|---|---|---|---|---|---|---|---|---|---|---|---|---|
| HCl[8) 10)] | % | <0.025 | <0.025 | <0.025 | <0.025 | <0.025 | <0.025 | <0.025 | <0.025 | <0.025 | <0.025 | <0.1 |
| Sieve residue[6)] according to Mocker, 45 mm) | % | <0.05 | <0.05 | <0.05 | <0.05 | <0.05 | <0.05 | <0.2 | <0.05 | <0.1 | <0.1 | <0.1 |

[1)] in accordance with DIN 66131
[2)] in accordance with DIN ISO 787/XI, JIS K 5101/18 (not sieved)
[3)] in accordance with DIN ISO 787/II, ASTM D 280, JIS K 5101/21
[4)] in accordance with DIN 55921, ASTM D 1280, JIS K 5101/23
[5)] in accordance with DIN ISO 787/IX, ASTM D 1208, JIS K 5101/24
[6)] in accordance with DIN ISO 787/XVIII, JIS K 5101/20
[7)] referred to the substance dried for 2 hours at 105° C.
[8)] referred to the substance annealed for 2 hours at 1000° C.
[9)] special anti-moisture packaging
[10)] HCl content is part of the annealing loss
[11)] V product supplied in 20 kg sacks
[12)] VV product is currently supplied exclusively from the Rheinfelden works

| Test method | | AEROSIL R 972 | AEROSIL R 974 | AEROSIL R 202 | AEROSIL R 805 | AEROSIL R 812 | AEROSIL R 812 S | AEROSIL R 104 | AEROSIL R 106 |
|---|---|---|---|---|---|---|---|---|---|
| Behavior to water | | | | | hydrophobic | | | | |
| Appearance | | | | | loose white powder | | | | |
| Surface according to BET[1)] | m2/g | 110 + 20 | 170 + 20 | 100 + 20 | 150 + 25 | 260 + 30 | 220 + 25 | 150 + 25 | 250 + 30 |
| Mean size of the primary particles | nm | 16 | 12 | 14 | 12 | 7 | 7 | 12 | 7 |
| Tamped density/approx. value)[2)] | | | | | | | | | |
| Normal product | g/l | 50 | 50 | 50 | 50 | 50 | 50 | 50 | 50 |
| Compacted product (additive "V") | g/l | 90 | 90 | | | | | | |
| Drying loss[3)] (2 hours at 105° C.) on leaving the supplier | % | <0.5 | <0.5 | <0.5 | <0.5 | <0.5 | <0.5 | — | — |
| Annealing loss[4) 7)] (2 hours at 1000° C.) | % | <2 | <2 | 4–6 | 5–7 | 1.0–2.5 | 1.5–3.0 | — | — |
| C content | % | 0.6–1.2 | 0.7–1.3 | 3.5–5.0 | 4.5–6.5 | 2.0–3.0 | 3.0–4.0 | 1–2 | 1.5–3.0 |
| pH value[5)] | % | 3.6–4.4 | 3.7–4.7 | 4–6 | 3.5–5.5 | 5.5–7.5 | 5.5–7.5 | >4.0 | >3.7 |
| $SiO_2$[8)] | % | >99.8 | >99.8 | >99.8 | >99.8 | >99.8 | >99.8 | >99.8 | >99.8 |
| $Al_2O_3$[8)] | % | <0.05 | <0.05 | <0.05 | <0.05 | <0.05 | <0.05 | <0.08 | <0.05 |
| $Fe_2O_3$[8)] | % | <0.01 | <0.01 | <0.01 | <0.01 | <0.01 | <0.01 | <0.01 | <0.01 |
| $TiO_2$[8)] | % | <0.03 | <0.03 | <0.03 | <0.03 | <0.03 | <0.03 | <0.03 | <0.03 |
| HCl[8) 10)] | % | <0.05 | <0.1 | <0.025 | <0.025 | <0.025 | <0.025 | <0.002 | <0.025 |

[1)] in accordance with DIN 66131
[2)] in accordance with DIN ISO 787/XI, JIS K 5101/18 (not sieved)
[3)] in accordance with DIN ISO 787/II, ASTM D 280, JIS K 5101/21
[4)] in accordance with DIN 55921, ASTM D 1280, JIS K 5101/23
[5)] in accordance with DIN ISO 787/IX, ASTM D 1208, JIS K 5101/24
[6)] referred co substance dried for 2 hours at 105° C.
[7)] referred to substance annealed for 2 hours at 1000° C.
[8)] special anti-moisture packaging
[9)] HCl content is part of the annealing loss
[10)] in water: methanol = 1:1
[11)] HCl content is part of the annealing loss
[12)] V product supplied in 15 kg net sacks

| Properties | | AEROSIL R 8200 |
|---|---|---|
| Behavior to water | | hydrophobic |
| Surface according to BET | m²/g | 160 ± 25 |
| Tamped density | g/l | ca. 140 |
| Drying loss (2 hrs. at 105° C.) | % | ≤0.5 |
| PH value (4% in water) | | ≥5.5 |
| Carbon content | % | 2.0–4.0 |
| $SiO_2$ | % | ≥99.8 |
| $Fe_2O_3$ | % | ≤0.01 |
| $TiO_2$ | % | ≤0.03 |
| HCl | % | ≤0.025 |

Gel compositions that may be used according to the invention based on reaction products of polyols and polyisocyanates (polyurethanes) are known.

Thus, for example, documents EP 0 511 570 B1, EP 0 057 838 and EP 0 057 839 B1 describe gel compositions that may be used to produce the gel compositions according to the invention.

The present invention also provides a process for the production of the gel compositions according to the invention based on reaction products of polyols and polyisocyanates, wherein a mixture of a) one or more polyisocyanates and b) one or more polyol components and c) at least one pyrogenically produced oxide of a metal or metalloid is allowed to gel.

The process according to the invention for producing the gel compositions according to the invention may be characterized by the fact that the isocyanate functionality and the functionality of the polyol component is at least 5.2, preferably at least 6.5, and in particular at least 7.5.

The polyol component may comprise a mixture of a) one or more polyols with hydroxyl numbers of less than 112 and b) one or more polyols with hydroxyl numbers in the range from 112 to 600, the weight ratio of the component a) to component b) being between 90:10 and 10:90, the isocyanate index of the reaction mixture being in the range from 15 to 59.81, and the mathematical product of the isocyanate functionality and functionality of the polyol component being at least 6.15.

In the process according to the invention a mixture of the following composition may be allowed to gel:

a) one or more polyisocyanates and b) a polyol component consisting of
one or more polyols ($b_1$) with hydroxyl numbers less than 112 and
one or more polyols ($b_2$) with hydroxyl numbers in the range from 112 to 600 and c) optionally a catalyst for the reaction between isocyanate groups and hydroxyl groups and d) optionally fillers and/or additives known per se in polyurethane chemistry, the weight ratio of the component ($b_1$) to component ($b_2$) being between 90:10 and 10:90, the isocyanate index of the reaction mixture being in the range from 15 to 59.81, and the mathematical product of the isocyanate functionality and functionality of the polyol component being at least 6.15.

The polyol component may comprise one or more polyols with a molecular weight between 1000 and 12000 and an OH number between 20 and 112, the mathematical product of the functionalities of the polyurethane-forming components being at least 5.2 and the isocyanate index being between 15 and 60.

As isocyanates there may be used those of the formula $$Q(NCO)_n$$

in which n is 2 to 4, and

Q denotes an aliphatic hydrocarbon radical with 8 to 18 C atoms, a cycloaliphatic hydrocarbon radical with 4 to 15 C atoms, an aromatic hydrocarbon radical with 6 to 15 C atoms, or an araliphatic hydrocarbon radical with 8 to 15 C atoms.

The mixture may optionally also contain a catalyst for the reaction between isocyanate groups and hydroxyl groups as well as the further fillers and/or additives known per se from polyurethane chemistry.

The polyols that are used may have primary and/or secondary hydroxyl groups. In the case where mixtures of polyols with primary and secondary hydroxyl groups are used, it can be established that the primary hydroxyl groups react preferentially with the isocyanate components. In this case possibly only the primary hydroxyl groups of the polyol component might be considered in connection with the term "functionality of the polyol component". However, in order to calculate the isocyanate index within the context of the present invention the total number of hydroxyl groups of the polyol component must be included in each case.

In the production of the gel compositions according to the invention the mathematical product of the isocyanate functionality and functionality of the polyol component may be at least 6.15, preferably at least 6.5, and in particular at least 7.5.

In addition to its function as a chemical building block for the polyurethane matrix, the polyol component also fulfils the rôle of a dispersing agent. The polyols to be used according to the invention may preferably be polyhydroxy-polyesters, polyhydroxy-polyethers, polyhydroxy-polythioethers, polyhydroxy-polyacetals, polyhydroxy-polycarbonates, polyhydroxy-polyester amides, polyhydroxy-polyamides or polyhydroxy-polybutadienes known per se in polyurethane chemistry, and that are liquid at 10 to 60° C. and have hydroxyl numbers in the ranges specified above.

The polyhydroxy-polyesters may for example be reaction products of polyhydric, preferably dihydric and optionally in addition trihydric alcohols with polybasic, preferably dibasic carboxylic acids. Instead of the free polycarboxylic acids, the corresponding carboxylic acid anhydrides or corresponding polycarboxylic acid esters of lower alcohols or their mixtures may also have been used to produce the polyester. The polycarboxylic acids may be aliphatic, cycloaliphatic, aromatic and/or heterocyclic in nature and may optionally be substituted, for example by halogen atoms, and/or may be unsaturated.

As examples of such carboxylic acids, their anhydrides and their esters, the following compounds may be mentioned: succinic acid, adipic acid, suberic acid, azelaic acid, sebacic acid, phthalic acid, isophthalic acid, trimellitic acid, phthalic anhydride, tetrahydrophthalic anhydride, hexahydrophthalic anhydride, tetrachlorophthalic anhydride, endomethylenetetrahydrophthalic anhydride, glutaric anhydride, maleic acid, maleic anhydride, fumaric acid, dimerized and trimerized unsaturated fatty acids (optionally mixed with monomeric unsaturated fatty acids, for example oleic acid), dimethyl terephthalate and terephthalic acid bis-glycol ester.

Examples of suitable polyhydric alcohols are ethylene glycol, propylene glycol-(1,2) and -(1,3), butylene glycol-(1,4), -(1,3) and -(2,3), hexanediol-(1,6), octanediol-(1,8), neopentyl glycol, 1,4-bis-hydroxymethylcyclohexane, 2-methyl-1,3-propanediol, glycerol, trimethylolpropane, hexanetriol-(1,2,6), butanetriol-(1,2,4), trimethylolethane, pentaerythrytol, quinitol, mannitol, sorbitol, formitol, methyl glycoside, diethylene glycol, triethylene glycol, higher polyethylene glycols, dipropylene glycol, higher polypropylene glycols, dibutylene glycol and higher polybutylene glycols. The polyesters may contain a proportion of terminal carboxyl groups. Polyesters of lactones, for example ε-caprolactone, or of hydroxycarbocylic acids, for example ω-hydroxycaproic acid, may also be used.

The polyhydroxy-polyethers may for example be polyethers containing at least two, in general two to eight, and preferably three to six hydroxyl groups. Such polyhydroxy-polyethers are known per se and may be produced for example by homopolymerization of epoxides such as ethylene oxide, propylene oxide, butylene oxide, tetrahydrofuran, styrene oxide and/or epichlorohydrin, for example in the presence of Lewis catalysts such as $BF_3$, or by addition of these epoxides, preferably ethylene oxide and/or propylene oxide, when using two or more epoxides as a mixture or in succession, to starter components containing reactive hydrogen atoms, such as water, alcohols, ammonia or amines, for example ethylene glycol, propylene glycol-(1,3), propylene glycol-(1,2), trimethylolpropane, glycerol, sorbitol, 4,4'-dihydroxydiphenylpropane, aniline, ethanolamine or ethylenediamine. Also suitable are sucrose polyethers, such as are described for example in DE-AS 1 176 358 and DE-AS 1 064 938, as well as polyethers formed from formitol or formose as starting compounds (see DE-OS 2 639 083 and DE-OS 2 737 951).

Polybutadienes containing OH groups are also suitable as polyols.

The polyhydroxy-polythioethers that are of interest are in particular the condensation products of thiodiglycol with itself and/or with other glycols, dicarboxylic acids, formaldehyde, aminocarboxylic acids and/or aminoalcohols. Depending on the co-components, such products include for example polythio mixed ethers, polythio ether esters or polythio ether ester amides.

Suitable polyhydroxy-polyacetals are for example the compounds that can be produced from glycols such as diethylene glycol, 4,4'-dioxyethoxydiphenylmethane and hexanediol, with formaldehyde. Polyacetals suitable for the present invention can also be produced by polymerizing cyclic acetals, for example trioxane (see DE-OS 1 694 128).

Suitable polyhydroxy-polycarbonates are for instance types known per se that can be produced for example by reacting diols such as propanediol-(1,3), butanediol-(1,4), hexanediol-(1,6), diethylene glycol, triethylene glycol, tetraethylene glycol and/or thiodiglycol with diaryl carbonate, or phosgene (see DE-AS 1 694 080, DE-AS 1 915 908, DE-AS 2 221 751 and DE-OS 2 605 024).

The polyhydroxyl-polyester amides and polyhydroxyl-polyamides may for example be the predominantly linear condensates obtained from polybasic saturated or unsaturated carboxylic acids or their anhydrides and polyfunctional saturated or unsaturated aminoalcohols, diamines, polyamines and their mixtures.

Polyhydroxyl compounds already containing urethane or urea groups, as well as optionally modified natural polyols such as castor oil, may also be used as polyol component in the process according to the invention.

Furthermore polyhydroxyl compounds containing high molecular weight polyadducts, polycondensates or polymers in finely dispersed or dissolved form may optionally be used as polyol component. Such polyhydroxyl compounds may be obtained for example by carrying out polyaddition reactions (for example reactions between polyisocyanates and aminofunctional compounds) or polycondensation reactions (for example between formaldehyde and phenols and/or amines) in situ in the compounds containing hydroxyl groups mentioned above; such processes are described for example in DE-AS 1 168 075, DE-AS 1 260 142 and in German laid-open specifications 2 324 134, 2 423 984, 2 512 385, 2 513 815, 2550 797, 2 550 833, 2 550 862, 2 633 293 and 2 639 254. It is also possible to use polyhydroxyl compounds containing high molecular weight polyadducts, condensates or polymers that are obtained by mixing an aqueous polymer dispersion with a polyhydroxyl compound and then removing the water from the mixture (see U.S. Pat. No. 3,869,413 and DE-OS 2 550 860).

Also suitable as polyol component for the process according to the invention are polyhydroxyl compounds modified by vinyl polymers, such as may be obtained for example by polymerization of styrene and acrylonitrile in the presence of polyethers (see U.S. Pat. Nos. 3,383,351, 3,304,273, 3,523,093 and 3,110,695, as well as DE-AS 1 152 536) or polycarbonate polyols (see DE-PS 1 769 795 and U.S. Pat. No. 3,637,909). When using polyether polyols that have been modified according to German laid-open specifications 2 442 101, 2 644 922 and 2 646 141 by graft polymerization with vinylphosphonic acid esters as well as optionally (meth)acrylamide or OH-functional (meth)acrylic acid esters, gel compositions are obtained having a particularly good flame resistance.

Polyol components to be used according to the invention are described for example in High Polymers, Vol. XVI, "Polyurethanes, Chemistry and Technology", edited by Saunders-Frisch, Interscience Publishers, New York-London, Vol. I, (1962), pp.32–42 and pp.44–54 and Vol. II, (1964), pp.5–6 and 198–199, as well as in Kunststoff-Handbuch, Vol. VII, Vieweg-Höchtlen, Carl-Hanser-Verlag, Munich (1966), for example on pages 45–71. Obviously mixtures of the aforementioned compounds, for example mixtures of polyethers and polyesters, may also be used.

Preferably the polyhydroxy polyethers of the aforementioned type containing 2 to 8, preferably 3 to 6 hydroxyl groups per molecule known per se in polyurethane chemistry are used as polyol component according to the invention. Particularly preferred in this connection, optionally as a mixed component with other polyethers, are those containing at least terminal ethylene oxide units and thus primary hydroxyl groups. The proportion of ethylene oxide sequences in the polyethers to be used according to the invention is preferably at least 15 wt. %, particularly preferably at least 20 wt. %.

Aliphatic, cycloaliphatic, araliphatic, aromatic and/or heterocyclic polyisocyanates may for example be used as polyisocyanates for the production of gel compositions according to the invention, such as are described for example by W. Siefken in Justus Liebigs Annalen der Chemie, 562, pp.75 to 136, for example polyisocyanates of the formula $$Q(NCO)_n$$

in which n is 2 to 4, preferably 2, and

Q denotes an aliphatic hydrocarbon radical with 2 to 18, preferably 6 to 10 C atoms, a cycloaliphatic hydrocarbon radical with 4 to 15, preferably 5 to 10 C atoms, an aromatic hydrocarbon radical with 6 to 15, preferably 6 to 13 C atoms, or an araliphatic hydrocarbon radical with 8 to 15, preferably 8 to 13 C atoms.

The following may be mentioned as individual compounds of this type:

ethylene diisocyanate, 1,4-tetramethylene diisocyanate, 1,6-hexamethylene diisocyanate, 1,12-dodecane diisocyanate, cyclobutane-1,3-diisocyanate, cyclobutane-1,4-diisocyanate, cyclohexane-1,3-diisocyanate and arbitrary mixtures of these isomers, 1-isocyanato-3,3,5-trimethyl-5-isocyanatomethylcyclohexane (DE-AS 1 202 785 and U.S. Pat. No. 3,401,190), 2,4- and 2,6-hexahydrotoluylene diisocyanate and arbitrary mixtures of these isomers, hexahydro-1,3-phenylene diisocyanate and/or hexahydro-1,4-phenylene diisocyanate, perhydro-2,4'-diphenylmethane diisocyanate, and/or perhydro-4,4'-diphenylmethane diisocyanate, 1,3-phenylene diisocyanate and 1,4-phenylene diisocyanate, 2,4-toluylene diisocyanate and 2,6-toluene diisocyanate and arbitrary mixtures of these isomers, diphenylmethane-2,4'-diisocyanate and/or diphenylmethane-4,4'-diisocyanate, and naphthylene-1,5-diisocyanate.

Also suitable are for example the following compounds: triphenylmethane-4,4',4"-triisocyanate, polyphenyl-polymethylene polyisocyanates, such as are obtained by aniline-formaldehyde condensation followed by phosgenation and described for example in GB-PS 874 430 and GB-PS 848 671, m- and p-isocyanatophenylsulfonyl isocyanates (see U.S. Pat. No. 3,277,138), polyisocyanates containing carbodiimide groups (see DE-PS 1 092 007, U.S. Pat. No. 3,152,162 and German laid-open specification 2 502 400,2 537 685 and 2 552 350), norbornane diisocyanates (according to U.S. Pat. No. 3,492,330), polyisocyanates containing allophanate groups (see GB-PS 994 890, BE-PS 761 626 and Dutch patent application 71 02 524), polyisocyanates containing isocyanurate groups (see U.S. Pat. No. 3,01,973, German patent specification 1 022 789, 1 222 067 and 1 027 394, DE-OS 1 929 034 and DE-OS 2004 048), polyisocyanates containing urethane groups (see BE-PS 752 261, U.S. Pat. No. 3,394,164 and U.S. Pat. No. 3,644,457), polyisocyanate containing acylated urea groups (see DE-PS 1 230 778), polyisocyanates containing biuret groups (see U.S. Pat. Nos. 3,124,605 and 3,201,372 and GB-PS 889 050), polyisocyanate produced by telomerization reactions (see DE-PS 3 654106), polyisocyanates containing ester groups (see GB patent specification 965 474 and 1 072 956, U.S. Pat. No. 3,567,763 and DE-PS 1 231 688), reaction products of the aforementioned isocyanate with acetals (see DE-PS 1 072 385) and polyacetals containing polymeric fatty acid esters (see U.S. Pat. No. 3,455,883).

It is also possible to use the distillation residues containing isocyanate groups and formed in the industrial production of isocyanates, optionally dissolved in one or more of the aforementioned polyisocyanates. Moreover, it is possible to use arbitrary mixtures of the aforementioned polyisocyanates.

Preferred isocyanates are for example 2,4-toluylene diisocyanate and 2,6-toluylene diisocyanate and arbitrary mixtures of these isomers, polyphenyl-polymethylene polyisocyanates such as may be produced by aniline-formaldehyde condensation followed by phosgenation, and polyisocyanates containing carbodiimide groups, urethane groups, allophanate groups, isocyanurate groups, urea groups or biuret groups.

Particularly preferred polyisocyanates are biuretized or trimerized 1,6-hexamethylene diisocyanate, diphenylmethane-4,4'-diisocyanate modified by tripropylene glycol, mixtures of polyphenyl-polymethylene polyisocyanates and diphenylmethane-2,4'-diisocyanate and diphenylmethane-4,4'-diisocyanate, mixtures of polyphenyl-polymethylene polyisocyanates and diphenylmethane-2,4'-diisocyanate and diphenylmethane-4,4'-diisocyanate, the binuclear proportion preferably being more than 70 wt. % and at the same time the content of 2,4'-isomers being above 30%.

The content of polyisocyanates in the mixtures to be produced for gel compositions according to the invention is for example 5 to 50 wt. %, preferably 9 to 35 wt. %, referred to the total weight of the polyol component and polyisocyanates.

The gel-forming reaction, which proceeds slowly as such, may optionally be accelerated by adding catalysts. In this connection there may be used catalysts known per se that accelerate the reaction between hydroxyl groups and isocyanate groups, for example tertiary amines such as triethylamine, tributylamine, N-methylmorpholine, N-ethylmorpholine, N,N,N,N-tetramethylethylenediamine, 1,4-diaza-bicyclo-(2,2,2)-octane, N-methyl-N-dimethylaminoethylpiperazine, N,N-dimethylbenzylamine, bis-(N,N-diethylaminoethyl)-adipate, pentamethyldiethylenetriamine, N,N-dimethylcyclohexylamine, N,N,N',N'-tetramethyl-1,3-butanediamine, N,N-dimethyl-β-phenylethylamine, 1,2-dimethylimidazole and 2-methylimidazole. As catalysts there may also be used Mannich bases known per se and formed from secondary amines such as dimethylamine, and aldehydes, preferably formaldehyde, or ketones such as acetone, methyl ethyl ketone or cyclohexanone, and phenols such as phenol, nonylphenol or bisphenols.

As catalysts there may furthermore be used silaamines with carbon-silicon bonds (see for example DE-PS 1 229 290 and U.S. Pat. No. 3,620,984), for example 2,2,4-trimethyl-2-silamorpholine and 1,3-diethylaminomethyltetramethyl disiloxane.

Also suitable as catalysts are nitrogen-containing bases such as tetralkyl ammonium hydroxides, alkali metal hydroxides such as sodium hydroxide, alkali phenolates such as sodium phenolate, or alkali metal alcoholates such as sodium methylate. Hexahydrothiazines may also be used as catalysts.

In addition organometallic compounds, in particular organic tin compounds, are also suitable as catalysts. Preferred organic tin compounds are tin(II) salts of carboxylic acids such as tin(II) acetate, octoate, ethylhexoate, and tin(V)-compounds, for example dibutyltin(IV) oxide, chloride, acetate, dilaurate, maleate or dioctyltin acetate.

Further catalysts as well as details of the mode of action of the catalysts are described in Kunststoff-Handbuch, Vol. VII, edited by Vieweg and Hochtlen, Carl-Hanser-Verlag, Munich 1966, for example on pages 96–102. Mixtures of different catalysts may also be used.

The catalysts may be used for example in an amount of 0.01 to 10 wt. %, referred to the total weight of the mixture used for the production of the gel compositions.

The fillers and/or additives known per se from polyurethane chemistry and optionally contained in the gel compositions according to the invention include for example inorganic and/or organic fillers, coloring agents, water-binding agents, surface-active substances, plant protection agents, extenders and/or plasticizers.

Further inorganic fillers may for example include: barytes, chalk, gypsum, kieserite, sodium carbonate, titanium oxide, quartz sand, kaolin, carbon black or glass beads. Organic fillers may for example include: powders based on polystyrene, polyvinyl chloride, urea-formaldehyde compositions and/or polyhydrazodicarbonamides (obtained for example from hydrazine and toluylene diisocyanate). In this connection for example urea-formaldehyde resins or polyhydrazodicarbonamides may have been produced directly in a polyol to be used for the production of the gel compositions according to the invention. Hollow microspheres of organic origin may also be added.

Inorganic and/or organic fillers may also be used in the form of short fibers. Suitable as short fibers are for example glass fibers and/or fibers of organic origin, for example polyester or polyamide fibers. The short fibers may for example be 0.01 to 1 cm long. Inorganic fillers may also be metal powders, for example iron or copper powder.

As coloring agents the gel compositions according to the invention may for example contain dyes and/or pigments based on organic and/or inorganic compounds and known per se for coloring polyurethane, for example iron oxide and/or chromium oxide pigments and phthalocyanine-based and/or monoazo-based pigments.

Zeolites are preferably used as water-binding agents. Suitable synthetic zeolites are for example commercially available under the trade name Baylith®.

Suitable examples of surface-active substances that may be mentioned are cellulose powder, activated charcoal and silicic acid preparations. Sodium polymetaphosphates or aminophosphates, for example melamine phosphates, may for example be added as flame retardants.

Suitable as extenders are in particular liquid, practically inert substances that have a boiling point of above 150° C. (at normal pressure). The following may be mentioned by way of example: alkyl-, alkoxy- and/or halogen-substituted aromatic compounds such as dodecylbenzene, m-dipropoxyl-benzene and/or o-dichlorobenzene, halogenated aliphatic compounds such as chlorinated paraffins, organic carbonates such as propylene carbonate, carboxylic acid esters such as dioctyl phthalate, as well as dodecylsulfonic acid esters and organic phosphorus compounds such as tricresyl phosphate.

As plasticizers there may for example be mentioned esters of polybasic, preferably dibasic carboxylic acids with monohydric alcohols. The acid component of such esters may be derived for example from succinic acid, isophthalic acid, trimellitic acid, phthalic anhydride, tetrahydrophthalic anhydride and/or hexahydrophthalic anhydride, endomethylenetetrahydrophthalic anhydride, glutaric anhydride, maleic anhydride, fumaric acid and/or dimerized and/or trimerized fatty acids such as oleic acid, optionally mixed with monomeric fatty acids. The alcohol component of such esters may be derived for example from branched and/or aliphatic alcohols with 1 to 20 C atoms, such as methanol, ethanol, propanol, isopropanol. n-butanol, sec.-butanol, tert.-butanol, the various isomers of pentyl alcohol, hexyl alcohol, octyl alcohol (for example 2-ethylhexanol), nonyl alcohol, decyl alcohol, lauryl alcohol, myristyl alcohol, cetyl alcohol, stearyl alcohol and/or from naturally occurring fatty alcohols and wax alcohols or from fatty alcohols and wax alcohols obtained by hydrogenation of naturally occurring carboxylic acids. Also suitable as alcohol component are cycloaliphatic and/or aromatic hydroxy compounds, for example cyclohexanol and its homologues, phenol, cresol, thymol, carvacrol, benzyl alcohol and/or phenylethanol.

Esters of the aforementioned alcohols with phosphoric acid are furthermore suitable as plasticizers. Optionally, phosphoric acid esters of halogenated alcohols, such as for example trichloroethyl phosphate, may be used. In this last case a flame-inhibiting effect may be obtained at the same time as the plasticizing effect. Mixed esters of the aforementioned alcohols and carboxylic acids may obviously also be used.

The plasticizers may also be so-called polymeric plasticizers, for example polyesters of adipic, sebacic and/or phthalic acids.

Alkylsulfonic acid esters of phenol, for example paraffinsulfonic acid phenyl esters may furthermore also be used as plasticizers.

The content of fillers and/or additives in the gel compositions according to the invention and in their production may for example be up to 70 wt. %, referred to the total weight of the gel composition.

In a particular embodiment of the production of the gel compositions according to the invention, air or another gas may be forced or stirred into the reaction mixture, for example in an amount of up to 60 vol. %, referred to the gel volume. The gel compositions produced in this way are characterized by a low weight.

The gel compositions according to the invention may be used for example in the form of two-dimensional or three-dimensional contoured parts. To this end it is generally necessary to provide the gel compositions with a partial, one-sided or all-round coating, covering or sheathing.

In uses in which the specifically adjustable adhesion capacity of the gel compositions is to be utilized, for example in application to human or animal body surfaces, only a partial or one-sided coating or covering is required. This is particularly the case in applications involving one-off use.

An all-round, i.e. complete sheathing of the gel composition is necessary for reasons of hygiene in many applications. In order to obtain the special properties, such as for example dissipation of shear forces, absorption of pressure and impact, and high flexibility of the gel compositions, it is advantageous to use elastic, extensible sheathing materials for this purpose. In particular elastic films are suitable for this purpose, for example polymer films having a good tough, elastic behavior (measured for example in the biaxial impact penetration test according to DIN 55 373) and a high elongation at break and high breaking load (measured for example according to DIN 53 455).

Such films may for example be polyurethane films such as are available under the trade names Walopur® from Wolff-Walsrode and Platinol® from Plate. Suitable films may also be produced from thermoplastic polyester elastomers (for example Hytrel® from DuPont) or from block copolymers based on styrene and butadiene, optionally mixed with polyolefins. Suitable styrene-based block copolymers are for example the products available from Shell under the trade name Cariflex®. Also suitable are styrene-ethylene-butylene-styrene block copolymers, available for example from Shell under the trade name Kraton®. Other suitable films are those obtained from ethylene-vinyl acetate polymers, optionally in combination with other polymer films, as well as thin films from natural or synthetic rubber materials. It is also possible to use films produced from plasticized polyvinyl chloride.

These films can be thermally shaped, welded or adhesion-bonded. It is accordingly particularly easy to produce from these films suitable sheetings that contain gel compositions according to the invention.

In a particular embodiment sheathings for gel compositions according to the invention can also be obtained by welding or adhesion-bonding a covering film onto deep-drawn articles fabricated from the aforementioned films, or bonding together or welding two deep-drawn half-shells fabricated from these films.

Also suitable as sheathing are coated elastic textile sheet materials such as wovens, knitted fabrics or fleece materials of natural or synthetic, organic or inorganic fiber materials having an elastic nature and exhibiting a high elongation at break and breaking force (according to DIN 53 455). Suitable coatings for such elastic textile sheet materials are for example elastic polyurethane coatings, such as are available for example from BAYER AG under the trade name Impranil®. Coatings based on plasticized polyvinyl chloride are also possible.

Such coated textile sheet materials can be sewn, adhesion-bonded or welded. It is therefore particularly simple to produce from coated textile sheet materials suitable sheathings for the gel compositions according to the invention.

The sheathing of the gel compositions according to the invention may also be performed by applying a liquid or dissolved material to the surface of the gel composition, where it solidifies to form an elastic material or where it can be subjected to another film-forming process. Particularly suitable for this purpose are coating materials based on polyurethane, such as are available for example from BAYER AG under the trade name Impranil®, which may then be applied in solution or as a dispersion to a gel composition according to the invention and form a suitable elastic sheathing after removal of the solvent or dispersing agent.

Suitable flexible sheathings may also be obtained by coating the gel composition with a polyurethane-forming two-component lacquer.

The production according to the invention of gel compositions may be carried out in various ways.

For example, the one-shot process or the prepolymer process may be employed. In the one-shot process all components, for example polyisocyanates, optionally catalysts and optionally fillers and/or additives are added in one step and intensively mixed with one another.

In the prepolymer process two different procedures are possible. Either an isocyanate prepolymer is first of all produced by reacting part of the amount of polyol with the total amount of polyisocyanate intended for the gel formation, and then adding the remainder of the polyol as well as optionally a catalyst, fillers and/or additives to the prepolymer obtained, and intensively mixing the whole batch. Alternatively the total amount of polyol intended for the gel formation may first of all be reacted with part of the amount of polyisocyanate to form a hydroxyl-containing prepolymer and then mixing in the remainder of the isocyanate and the optionally used components.

Particularly advantageous is a variant of the one-shot process in combination with the hydroxyl-containing prepolymer process. In this case the polyol mixture, optionally the catalyst and/or the fillers and/or additives and two different polyisocyanates are added in one step and intensively mixed. In this connection one of the polyisocyanates is aromatic and the other is aliphatic. On account of the widely different reactivities of these two types of polyisocyanates a hydroxyl-containing prepolymer is first of all formed from all the polyol and the more reactive polyisocyanate, which then reacts generally within a few minutes with the less reactive polyisocyanate to form the gel. Gel compositions with particularly high toughness values are thereby obtained.

In all these procedures the conveyancing, metering and mixing of individual components or component mixtures may be carried out using equipment known per se in polyurethane chemistry.

The production of articles containing gel compositions according to the invention may be carried out in various ways. The gel compositions may for example first of all be produced in a mould and the dimensionally stable gel composition resulting from the reaction is then covered, lacquered or coated with a flexible film or a flexible material. Alternatively, according to a particularly preferred, very simple procedure the components required for the production of the gel composition are mixed in a mechanical mixer and the mixture is then poured directly into a sheathing of an elastic, flexible film or an elastic coated textile sheet material.

After addition of the mixture the sheathing can be sealed tight and the gel formation can be left to take place inside by itself. Optionally the sheathing can be inserted between two plane-parallel plates or added to another mould during the gel formation. A gel-containing structural part is then obtained having substantially parallel upper and lower sides or a shape corresponding to the inside of the mould that is used. Depending on the nature of the reaction components, added catalysts and temperature conditions, the time up to the end of the gel formation may for example be from 1 minute up to 12 hours. The temperature of the components that are used is preferably 10 to 60° C.

This particularly preferred procedure enables articles of any arbitrary size and shape to be fabricated in a simple way by producing the sheathings in a generally known manner in the appropriate mold and filling them with the composition that is formed. Particularly preferred shapes and sizes are square and rectangular cushions with an edge length of for example 20 to 60 cm.

The thickness of the articles may also be varied within wide limits. When used as seat cushions, generally square in shape with an edge length of 35 to 45 cm, the best results are obtained with thicknesses of more than 2 cm. When used as mattresses, mattress inlays or mattress covers, articles of smaller thickness may also be advantageous.

The gel compositions according to the invention have the property that they deform under pressure and thus distribute the pressure, i.e. reduce pressure points, and return to their initial state after the deforming force has been removed. This property means that articles containing gel compositions according to the invention are able to change shape to such an extent under the pressure of a person sitting or lying on them that possible pressure wounds are avoided or the healing process of existing wounds is promoted.

Structural parts containing gel compositions according to the invention may be used in a wide variety of ways, for example as gel cushions in orthopedic shoes and sports shoes, on bicycle saddles, under horse riding saddles, on wheelchairs and sickbeds, on seating surfaces, back-supporting surfaces, headrests and armrests of chairs, car seats or other types of seating, on operating tables or medical examination tables, or in incubators.

Furthermore, structural parts or articles consisting of a gel composition according to the invention provided with a one-sided covering or coating and having a high bonding capability may in particular be used on human and animal body surfaces, for example as supports and coverings on elbows, shin bones or foot surfaces in order to avoid and reduce the effects of injuries, especially sports injuries, as supports for cosmetic masks, for example face masks, as self-adhesive coverings, for purposes of securement, for bandages and dressings for eyes and ears; as a support for slack breast tissue, as a cushion underneath horse saddles, on prostheses or on diapers to reduce pressure points. The gel compositions according to the invention may be used for prosthesis supports (gel or polyurethane liners) that are wound over the stump. They may furthermore be used for bicycle saddles and shoe inserts. Another possible application is in instrument panels and dashboards that are to be provided with a soft-touch feel. For this purpose films and/or textiles are coated with the gel according to the invention.

The gel compositions according to the invention based on reaction products of polyols, polyisocyanates and pyrogenically produced oxides exhibit advantageously a significant improvement in mechanical properties.

The tackiness of the polyurethane gel compositions is reduced by the addition, according to the invention, of pyrogenically produced oxide.

The gel compositions according to the invention furthermore have a lower density, which is advantageous for certain applications.

EXAMPLE 1

Sample 1: TechnoGel (aliphatic) BTG 135 without AEROSIL

Sample 2: TechnoGel (aliphatic) BTG 135 with 3% AEROSIL R 202

By incorporating and dispersing 3% of AEROSIL R 202 into the polyol component, the tensile strength is increased by 66% from 0.393 MPa to 0.654 MPa, the tear propagation resistance is increased by 27% from 3.0 N/mm to 3.8 N/mm, and the Shore A hardness is increased by 83% from 6 to 11. The elongation at break remains unchanged. Furthermore, the density in the sample containing AEROSIL R 202 is slightly reduced (by 3,2%) compared to the sample without AEROSIL R 202, from 1059 kg/m$^3$ to 1025 kg/m$^3$. Moreover the tackiness of the sample is reduced by AEROSIL, which is reflected in the easier cutting out of the test bodies.

The tensile strength was tested in accordance with DIN 53571 (variation, see test protocol with test parameters)1. The tear-propagation resistance was tested in accordance with DIN 53556. The Store A hardness was tested in accordance with DIN 53505. The bulk density was tested according to DIN 53420.

EXAMPLE 2

Sample 3: TechnoGel (aliphatic) BTG 130 without AEROSIL

Sample 4: TechnoGel (aliphatic) BTG 130 with 10% AEROSIL R 8200

Sample 5: TechnoGel (aliphatic) BTG 133 without AEROSIL

Sample 6: TechnoGel (aliphatic) BTG 132 with 15% AEROSIL R 8200

By incorporating and dispersing 10% of AEROSIL R 8200 (sample 4) into the polyol component, the tensile strength increases from 0.22 MPa to 1.14 MPa, corresponding to a rise of 418% compared to the sample without AEROSIL (sample 3). The Shore A hardness rises from 0 to 25. The elongation at break falls by 21% from 602% to 476%. The tackiness is also reduced.

By incorporating and dispersing 15% of AEROSIL R 8200 into the polyol component the tensile strength rises by 917% from 0.173 MPa (sample 5) to 1.76 MPa (sample 6).

EXAMPLE 3

Sample 7: TechnoGel TG-21-6A (aromatic) without AEROSIL

Sample 8: TechnoGel TG-3-21-6S2 (aromatic) with 3% AEROSIL 150

Sample 9: TechnoGel TG-5-21-6S2 (aromatic) with 5% AEROSIL 150

By incorporating and dispersing 3% of AEROSIL 150 into the polyol component the tensile strength rises by 70% from 0.33 MPa (sample 7) to 0.56 MPa (sample 8). The elongation at break rises by 37% from 566% to 777%.

The Shore A hardness rises from 0 to 1.

By incorporating and dispersing 5% of AEROSIL 150 into the polyol component the tensile strength rises by 161% from 0.33 MPa (sample 8) to 0.86 MPa (see sample 9). The elongation at break rises by 30% from 566% to 737%. The Shore A hardness rises from 0 to 2.

The tensile strength was tested according to DIN 53504.

The Shore A hardness was tested according to DIN 53505.

The pyrogenically produced oxides that are used are known oxides, and have the following physico-chemical characteristic data:

| Properties | | AEROSIL R 8200 |
|---|---|---|
| Behavior to water | | hydrophobic |
| Surface according to BET | m$^2$/g | 160 ± 25 |
| Tamped density | g/l | ca. 140 |
| Drying loss (2 hrs. at 105° C.) | % | ≦0.5 |
| pH-value (4% ig in water) | | ≧5.5 |
| Carbon content | % | 2.0–4.0 |
| SiO$_2$ | % | ≧99.8 |
| Fe$_2$O$_3$ | % | ≦0.01 |
| TiO$_2$ | % | ≦0.03 |
| HCl | % | ≦0.025 |

| | | AEROSIL 150 |
|---|---|---|
| Behavior to water | | hydrophilic |
| Surface according to BET[1] | m$^2$/g | 150 ± 15 |
| Mean size of the primary particles | Nm | 14 |
| Tamped density[2] | g/l | ca. 50 |
| Normal values | g/l | ca. 120 |
| Compacted articles (additive "V") | | |
| Drying loss[3] (2 hours at 105° C.) on leaving the factory | % | <0.5[9] |
| Annealing loss[4][7] (2 hours at 1000° C.) | % | <1 |
| pH value[5] (in 4% aqueous dispersion) | | 3.6–4.3 |
| SiO$_2$[8] | % | >99.8 |
| Al$_2$O$_3$[8] | % | <0.05 |
| Fe$_2$O$_3$[6] | % | <0.003 |
| TiO$_2$[6] | % | <0.03 |
| HCl[8][11] | % | <0.025 |
| Sieving residue[6] (according to Mocker, 45 μm) | % | <0.05 |
| Container size (net.)[15] | Kg | |

[1] In accordance with DIN 66 131
[2] In accordance with DIN ISO 787/XI, JIS K 5101/18 (not sieved)
[3] In accordance with DIN ISO 787/II, ASTM D 280, JIS K 5101/21
[4] In accordance with DIN 55 921, ASTM D 1208, JIS K 5101/23
[5] In accordance with DIN ISO 787/IX, ASTM D 1208, JIS K 5101/24
[6] In accordance with DIN ISO 787/XVIII, JIS 5101/20
[7] Referred to the substance dried for 2 hours at 105° C.
[8] Referred to the substance annealed for 2 hours at 1000° C.
[9] Special anti-moisture packaging
[10] In water/ethanol 1:1
[11] HCl content is part of the annealing loss
[12] Contains ca. 1% chemically bound carbon
[13] Contains ca. 5% chemically bound carbon
[14] Contains ca. 2.5% chemically bound carbon
[15] Compacted articles supplied in 20 kg sacks
[16] Is available as aluminum oxide CS for powder lacquers

|  |  | AEROSIL 150 |
|---|---|---|
| Behavior to water |  | hydrophilic |
| Surface according to BET[1]) | m$^2$/g | 150 ± 15 |
| Mean size of the primary particles | Nm | 14 |
| Tamped density[2]) | g/l | ca. 50 |
| Normal values Compacted articles (additive "V") | g/l | ca. 120 |
| Drying loss[3]) (2 hours at 105° C.) on leaving the factory | % | <0.5[9]) |
| Annealing loss[4])[7]) (2 hours at 1000° C.) | % | <1 |
| pH value[5]) (in 4% aqueous dispersion) |  | 3.6–4.3 |
| SiO$_2$[8]) | % | >99.8 |
| Al$_2$O$_3$[8]) | % | <0.05 |
| Fe$_2$O$_3$[6]) | % | <0.003 |
| TiO$_2$[6]) | % | <0.03 |
| HCl[8])[11]) | % | <0.025 |
| Sieving residue[6]) (according to Mocker, 45 μm) | % | <0.05 |
| Container size (net.)[15]) | Kg |  |

[1])In accordance with DIN 66 131
[2])In accordance with DIN ISO 787/XI, JIS K 5101/18 (not sieved)
[3])In accordance with DIN ISO 787/II, ASTM D 280, JIS K 5101/21
[4])In accordance with DIN 55 921, ASTM D 1208, JIS K 5101/23
[5])In accordance with DIN ISO 787/IX, ASTM D 1208, JIS K 5101/24
[6])In accordance with DIN ISO 787/XVIII, JIS 5101/20
[7])Referred to the substance dried for 2 hours at 105° C.
[8])Referred to the substance annealed for 2 hours at 1000° C.
[9])Special anti-moisture packaging
[10])In water/ethanol 1:1
[11])HCl content is part of the annealing loss
[12])Contains ca. 1% chemically bound carbon
[13])Contains ca. 5% chemically bound carbon
[14])Contains ca. 2,5% chemically bound carbon
[15])Compacted articles supplied to 20 kg sacks
[16])Is available as aluminum oxide CS for powder lacquers

What is claimed is:

1. A gel composition comprising a reaction product of a polyol and a polyisocyanate, and at least one of a pyrogenically produced oxide of a metal or a pryogenically produced oxide of a metalloid.

2. The gel composition according to claim 1, wherein the pyrogenically produced oxide is prepared by flame hydrolysis.

3. The gel composition according to claim 1, which contains a physical mixture of said pyrogenically produced oxide of a metal and said pyrogenically produced oxide of a metalloid.

4. The gel composition according to claim 1, which contains pyrogenically produced mixed oxides of at least one of a metal or metalloid.

5. The gel composition according to claim 1, wherein the pyrogenically produced oxide is a member selected from the group consisting of silica, aluminum oxide, mixed oxide of silica and aluminum oxide, titanium dioxide, and mixed oxide of titanium dioxide and iron oxide.

6. The gel composition according to claim 1, wherein the pyrogenically produced oxide is silica that has been surface treated with a member selected from the group consisting of dimethyl dichlorosilane, trimethyl dichlorosilane, hexamethyldisilazane, polymethyl siloxanes and alkylsilanes.

7. The gel composition according to claim 1, wherein said pyrogenically produced oxide is hydrophobic.

8. The gel composition according to claim 1, which additionally contains at least one member selected from the group consisting of barytes, chalk, gypsum, kieserite, sodium carbonate, titanium oxide, quartz sand, kaolin, carbon black and glass beads.

9. The gel composition according to claim 1, which additionally contains a powder selected from the group consisting of polystyrene, polyvinyl chloride, urea-formaldehyde, polyhydrazodicarbonamide and mixtures thereof.

10. The gel composition according to claim 1, which additionally contains a member selected from the group consisting of a coloring agent, water-binding agent, surface active agent, an extender agent and a plasticizer.

11. The gel composition according to claim 1, which contains up to 60% by volume of the gel of air or other gas.

12. An article of manufacture which is a two-dimensional or three-dimensional contoured part made of the gel composition according to claim 1.

13. The article of manufacture according to claim 12, which is provided with a one-sided or all-round coating, covering or sheathing.

14. The article of manufacture according to claim 13, wherein an elastic, extensible sheathing is provided.

15. The article of manufacture according to claim 12, which is a seat cushion, gel cushion for shoes, back cushion, head or arm rest, mattress, mattress inlay, mattress cover, support or covering for protection of body parts, face mask, a prosthesis support, or instrument panel in a vehicle.

16. A process for the production of a gel composition comprising forming a mixture of
   a) at least one polyisocyanate and
   b) at least one polyol component and
   c) at least one pyrogenically produced oxide of a metal or metalloid and allowing the mixture to gel.

17. The process for the production of the gel composition as claimed in claim 16, wherein the product of the isocyanate functionality and the functionality of the polyol component is at least 5.2.

18. The process for the production of the gel composition as claimed in claim 16, wherein the product of the isocyanate functionality and the functionality of the polyol component is at least 6.5.

19. The process for the production of the gel composition as claimed in claim 16, wherein the product of the isocyanate functionality and the functionality of the polyol component is at least 7.5.

20. The process as claimed in claim 16, wherein the polyol component consists of a mixture of
   a) at least one polyol with a hydroxyl number below 112 and
   b) at least one polyol component with a hydroxyl number in the range from 112 to 600, the weight ratio of the component a) to component b) being between 90:10 and 10:90, the isocyanate index of the reaction mixture being in the range from 15 to 59.81, and the mathematical product of the isocyanate functionality and functionality of the polyol component being at least 6.15.

21. The process as claimed in claim 16, wherein a mixture of
   a) at least one polyisocyanate and
   b) a polyol component consisting of
      at least one polyol (b$_1$) with a hydroxyl number less than 112 and at least one polyol (b$_2$) with a hydroxyl number in the range from 112 to 600 and c) optionally a catalyst for the reaction between isocyanate groups and hydroxyl groups and d) optionally, at least one filler or additive are allowed to gel the weight ratio of the component (b$_1$) to component (b$_2$) being between 90:10 and 10:90, the isocyanate index of the reaction mixture being in the range from 15 to 59.81, and the mathematical product of the isocyanate functionality and the functionality of the polyol component being at least 6.15.

22. The process as claimed in claim 16, wherein the polyol component consists of at least one polyol with a molecular weight between 1000 and 12000 and an OH number between 20 and 112, the mathematical product of the functionalities of the polyurethane-forming components being at least 5.2, and the isocyanate index being between 15 and 60.

23. The process as claimed in claim 16, wherein as isocyanates is represented by the formula Q(NCO)$_n$ in which n is 2 to 4, and Q denotes an aliphatic hydrocarbon radical with 8 to 18 C atoms, a cycloaliphatic hydrocarbon radical with 4 to 15 C atoms, an aromatic hydrocarbon radical with 6 to 15 C atoms, or an araliphatic hydrocarbon radical with 8 to 15 C atoms.

* * * * *